(12) United States Patent
Chen

(10) Patent No.: US 12,249,120 B2
(45) Date of Patent: Mar. 11, 2025

(54) METHOD, SYSTEM AND STORAGE MEDIA FOR TRAINING A GRAPHICS PROCESSING NEURAL NETWORK WITH A PATCH-BASED APPROACH

(71) Applicant: AETHERAI IP HOLDING LLC, Frisco, TX (US)

(72) Inventor: Chi-Chung Chen, Taipei (TW)

(73) Assignee: AETHERAI IP HOLDING LLC, Frisco, TX (US)

( * ) Notice: Subject to any disclaimer, the term of this patent is extended or adjusted under 35 U.S.C. 154(b) by 0 days.

(21) Appl. No.: 17/769,324

(22) PCT Filed: Aug. 26, 2020

(86) PCT No.: PCT/US2020/047856
§ 371 (c)(1),
(2) Date: Apr. 14, 2022

(87) PCT Pub. No.: WO2022/046041
PCT Pub. Date: Mar. 3, 2022

(65) Prior Publication Data
US 2024/0135677 A1    Apr. 25, 2024

(51) Int. Cl.
*G06V 10/764* (2022.01)
*G06V 10/26* (2022.01)
*G06V 10/82* (2022.01)

(52) U.S. Cl.
CPC .......... *G06V 10/764* (2022.01); *G06V 10/267* (2022.01); *G06V 10/82* (2022.01)

(58) Field of Classification Search
None
See application file for complete search history.

(56) References Cited

U.S. PATENT DOCUMENTS

| | | |
|---|---|---|
| 2018/0285686 A1 | 10/2018 | Pinheiro et al. |
| 2018/0300880 A1* | 10/2018 | Fan ...................... G06V 20/582 |
| 2019/0114511 A1 | 4/2019 | Gao et al. |

OTHER PUBLICATIONS

International Search Report and Written Opinion mailed on Nov. 20, 2020 in International Patent Application No. PCT/US20/47856, filed on Aug. 26, 2020.

* cited by examiner

*Primary Examiner* — Lennin R Rodriguezgonzalez
(74) *Attorney, Agent, or Firm* — Huan-Yi Lin

(57) ABSTRACT

Disclosed is a method for training a graphics processing neural network with a patch-based approach, which involves calculating an overlapping size and an invalid size of an output of each of at least one of multiple feature extraction layers of the graphic processing neural network according to a predetermined cropping scheme, dividing an input image into first patches in the forward pass and the first gradients into second patches in the backward pass to run streamline operation of the first and second patches. Before training, each first patch overlaps neighboring first patches at adjacent edges. In the forward pass, an invalid portion of the output of each of the at least one of the feature extraction layers cropped out based on the predetermined cropping scheme and a corresponding invalid size. Such method secures streamline operation in favor of enhanced memory utilization in training and accurate model prediction.

29 Claims, 6 Drawing Sheets

METHOD, SYSTEM AND STORAGE MEDIA FOR TRAINING A GRAPHICS PROCESSING NEURAL NETWORK WITH A PATCH-BASED APPROACH

BACKGROUND OF THE INVENTION

1. Field of the Invention

The present invention relates to a method, a system, and storage media for training an artificial neural network and, more particularly, to a method, a system and storage media for training a graphics processing neural network with a patch-based approach which divides an input image at diagnostic resolution into multiple patches and inputting the patches to train the graphics processing neural network with adjacent patches marginally overlapped to prevent information loss over boundary portions of the patches.

2. Description of the Related Art

As known to the artificial intelligent (AI) technology, convolutional neural networks (CNNs) are one type of artificial neural networks which are prominent in applications of objection detection because the computation amount resulting from feature extraction through the convolutional and pooling layers of CNNs can be highly reduced than any other type of artificial neural network.

Because CNNs take advantage of convolution arithmetic in extracting features from the input images, the convolutional part of CNNs for generating and pooling features always consume most of the computations and dominate the time duration in training the CNNs, especially when the input images are of high resolution, for example, the whole-slide images (WSI) made by digitizing microscope slides at diagnostic resolution typically at 100,000×100,000 pixels. Besides, due to the need for gradient calculation and weight update in the backward pass of the training, the feature maps that are generated in the forward pass have to be stored after their generation. Such computational load and storage of feature maps out of the convolution of CNNs poses challenge to the computation environment in training CNNs. Although specialized hardware, such as GPU (Graphics Processing Unit), is effective in accelerating the training of CNNs, its limited memory size, if not large enough to afford the need of huge amount of computation or memory space required during the course of training, such as when the specialized hardware needs to deal with input images with huge resolution in training CNNs, oftentimes causes the specialized hardware out of memory or swaps memory in and out the specialized hardware, which potentially deteriorates the efficiency and performance in training the CNNs. To circumvent such deterioration in efficiency and performance upon training, under the circumstance of no significant change made on the specialized hardware, one patch-based approach that adopts cropped patches of images as input for training CNNs is introduced. A paper entitled "High resolution medical image analysis with spatial partitioning" released by Google® proposes techniques called spatial partitioning and halo exchange to process input images of huge size. Although the spatial partitioning by Google® can split an input image into non-overlapping patches, this paper requires that the non-overlapping patches be processed in parallel by multiple computational devices, such as GPU or TPU (Tensor Processing Unit). Such parallel execution of patches in turn leads to a must of multiple computational devices in training. On the other hand, since convolution operations require input across the non-overlapping patches, the halo exchange sheds light on data exchange of patch margins from the non-overlapping patches on condition that all the non-overlapping patches are parallelly processed in the respective computational devices to enable the data exchange. The data parallelism approach of Google® fails to work when it is operated on a training platform at the absence of multiple computational devices. Besides, the patch margins exchanged during the convolution operations appear to be data swapped in and out the multiple computational devices, which worsens the efficiency and performance in training CNNs. One more thing about the paper of Google® is that perhaps because of the abundant memory space from so many computational devices, such pre-requisite allows it to ignore the issue in storing feature maps in the forward pass ever since the forward pass for the later gradient calculation in the backward pass.

SUMMARY OF THE INVENTION

An objective of the present invention is to provide a method, an input image, a system and computer storage media for training a graphics processing neural network with a patch-based approach ensuring that the patches divided by the patch-based approach can propagate through all layers of a graphics processing neural network in a streaming fashion to train the graphics processing neural network without the issue of information loss over the marginal portions of the patches.

To achieve the foregoing objective, the method is performed by a system including at least one processor with embedded memory, the method includes:

(a) one of the at least one processor calculating an invalid size of an output of each of at least one of multiple feature extraction layers of the graphic processing neural network according to a predetermined cropping scheme and an overlapping size;

(b) one of the at least one processor dividing an input image into multiple first patches in a patch pattern with each first patch having an augmented marginal portion overlapping other first patches adjacent to the first patch with the overlapping size;

(c) the at least one processor propagating the multiple first patches through the multiple feature extraction layers of the graphic processing neural network in a forward pass for each first patch to generate multiple feature maps, and cropping out an invalid portion from each of at least one feature map for each first patch according to the invalid size of the feature map and the predetermined cropping scheme; and (d) one of the at least one processor aggregating the last feature maps associated with the first patches according to the patch pattern to generate a global embedding map and passing the global embedding map to classification layers of the graphic processing neural network in the forward pass for model prediction.

Preferably, the method further includes:

(e) one of the at least one processor dividing first gradients of the global embedding map in a backward pass into multiple second patches paired with the respective first patches according to the patch pattern;

(f) the at least one processor propagating the multiple first patches through the multiple feature extraction layers in the forward pass for each first patch to generate the multiple feature maps, and cropping out an invalid portion from each of the at least one feature map for the first patch according to the invalid size of the feature map and the predetermined cropping scheme;

(g) the at least one processor selecting a last one of the feature extraction layers as a current feature extraction layer and recursively calculating second gradients of the current feature extraction layer for each second patch in the backward pass with the first gradients with respect to the output of the current feature extraction layer and the output and the weights of the current feature extraction layer for the first patch in a same pair, replacing the current feature extraction layer with the feature extraction layer right before the current feature extraction layer in the forward pass, and calculating the first gradients with respect to the output of the current feature extraction layer for the second patch in the selected pair with the weights and the output for the first patch in the same pair of a previous feature extraction layer and previously-calculated first gradients until the current feature extraction layer is first in the feature extraction layers in the forward pass and all the pairs are selected; and (h) one of the at least one processor adding up the second gradients of each feature extraction layer for the multiple second patches to generate global second gradients and updating weights of the feature extraction layer with the global second gradients.

To achieve the foregoing objective, the input image for training a graphics processing neural network includes multiple image patches divided according to a patch pattern, wherein each image patch overlaps other first patches adjacent thereto with an augmented marginal portion overlapping other image patches adjacent to the image patch with an overlapping size, the multiple image patches are adapted to propagate through multiple feature extraction layers of the graphics processing neural network to train the graphics processing neural network, and an invalid size of each image patch outputted from at least one of the feature extraction layers is cropped out, wherein the invalid size for an output of each of the at least one of the feature extraction layers is determined by a stride size and a padding size for the output of the feature extraction layer and a predetermined cropping scheme, and the invalid size for the input of the feature extraction layer with the input of a first one of the feature extraction layers initially assigned to zero, and the overlapping size for the input of each of the feature extraction layers is determined by the kernel size, the stride size, the overlapping size, wherein the overlapping size for the image patches is the overlapping size for the input of the first feature extraction layer that is obtained by sequentially calculating the overlapping sizes for the inputs of the feature extraction layers in a direction of a backward pass from a last one to a first one of the feature extraction layer with the overlapping size of the output of the last feature extraction layer initially assigned to the invalid size of the output of the last feature extraction layer.

To achieve the foregoing objective, the computer storage medium having computer-executable instructions thereupon that, when executed by at least one processor with embedded memory, cause the at least one processor to perform the foregoing method.

To achieve the foregoing objective, the system includes at least one processor with embedded memory storing instructions that, when executed by the at least one processor, cause the at least one processor to perform acts defined by the foregoing method.

According to the foregoing description, the padding size, the overlapping size and the invalid size for the patch-based approach are calculated before the training starts, and after an input image is first divided into multiple first patches, the first patches are already processed by the patch overlapping. In the forward pass, each first patch propagates through the convolutional part to generate a regional embedding map whose invalid portion is cropped out according to a corresponding invalid size. The regional embedding maps generated by all the first patches are further aggregated into a global embedding map for model prediction through the dense layers. In the backward pass, the first gradients generated with respect to the global embedding map are first generated and are divided into multiple second patches paired with the respective first patches. Prior to calculation of the second gradients of updating weights of each feature extraction layer, once the feature maps of all the feature extraction layers of the convolutional part associated with each selected first patch and the first gradients with respect to the output of a last feature extraction layer are generated, the second patch paired with the selected first patch is used to calculate the second gradients of updating the weights of each feature extraction layer for the second patch with the first gradients generated with respect to the output of the last feature extraction layer for the second patch and the output and the weights of the feature extraction layer for the selected first patch. Lastly, the second gradients of updating weights of each feature extraction layer for the multiple second patches are added up and the added second gradients as a whole can be used to update the weights of the feature extraction layer.

The benefits of the present invention reside in enhanced memory utilization of at least one processor with embedded memory, which is attributable to the sequential patch execution and storage for feature maps only at the backward pass when the second gradients are calculated for updating weights of the feature extraction layers. Particularly, the patch overlapping and the cropping of invalid portion on output feature maps is provided as a countermeasure for the issue of information loss on the boundary of output feature maps, which in turn leads to a more accurate model prediction. As the patch overlapping is implemented in an offline fashion before the training of the graphics processing neural network starts, such feature eliminates the need of transfer of marginal information between the first patches adjacent to each other during the training process and thus lays a critical building block to the success of the sequential execution of the first patches. Moreover, dividing the first gradients with respect to the global embedding map into the multiple second patches paired with the respective first patches for updating weights of each feature extraction layer further lays another building block to realize the idea of sequential patch execution. As the feature maps for updating the weights of each feature extraction layer are recalculated in the backward pass without having to be stored since the forward pass, such timely recalculation of the feature maps together with the foregoing sequential patch execution certainly optimizes the memory utilization of the at least one computational device.

Other objectives, advantages and novel features of the invention will become more apparent from the following detailed description when taken in conjunction with the accompanying drawings.

DETAILED DESCRIPTION OF THE INVENTION

Figure 1:
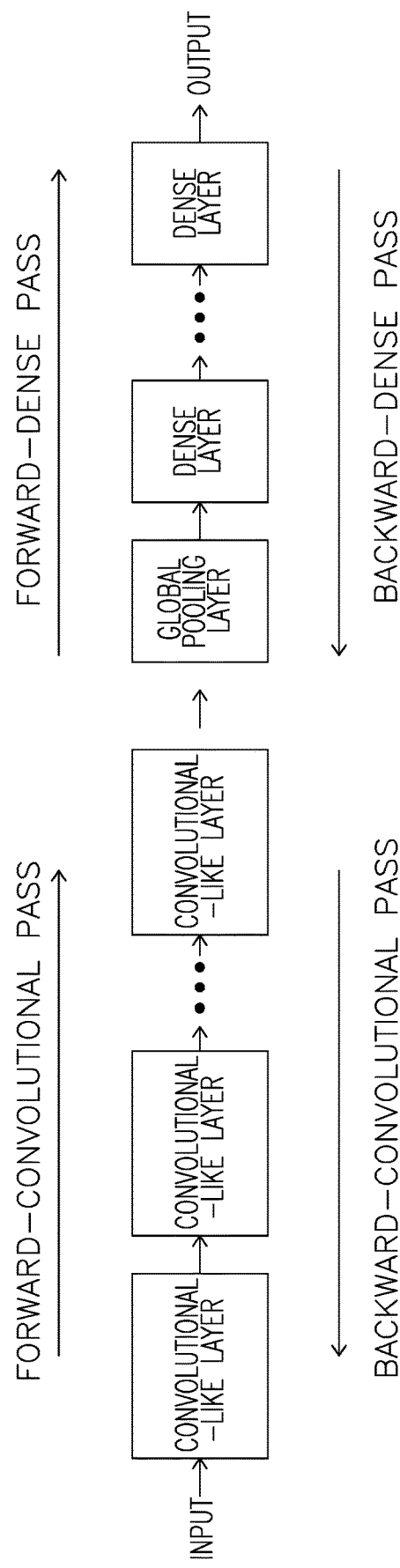
FIG. 1 is a schematic diagram showing a CNN training process in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), central processing units (CPUs), graphics processing units (GPUs), tensor processing units (TPUs), vision processor units (VPUs), dataflow processing units (DPUs), intelligent processing units (IPUs), etc.

The described embodiments concern one or more methods, systems, and computer readable mediums storing processor-executable process steps for training a graphics processing neural network, for example, a convolutional neural network, with input of image patches by virtue of a patch-based approach. The patch-based approach is addressed to deal with the issue of excessively large computation amount and memory size required in training the graphics processing neural network for sake of the input of an image with huge resolution typically at multi-gigabyte pixels. The patch-based approach encompasses techniques involved in division, aggregation, cropping and overlapping upon processing images, image patches, feature maps, and gradients. All these techniques are provided in response to two concerns. One concern is to reduce memory utilization because of the use of a full image with huge resolution for training. The other concern is to circumvent the feature loss over the boundary of the convoluted outputs of divided image patches, if the patch-based approach is employed, due to the convolution effect in training. Among the involved techniques, patch overlapping, and cropping are adopted to tackle the latter concern while the remaining techniques are dedicated to the former concern. Briefly, the patch-based approach involves (1) dividing an input image into multiple first patches before the training of the graphics processing neural network starts, (2) propagating the first patches through multiple feature extraction layers of the graphics processing neural network and cropping out the invalid portion of each of at least one feature extraction layer according to a predetermined cropping scheme and a corresponding invalid size, (3) aggregating the outputs of a final one of the feature extraction layers associated with the first patches and sending the aggregated outputs to classification layers for model prediction, (4) dividing gradients with respect to the aggregated outputs of the final feature extraction layer into multiple second patches, (5) sequentially processing the second patches to corresponding calculate gradients for weight update, (6) adding up the gradients for weight update associated with the second patches to update the weights of the feature extraction layers. The foregoing (1), (2) and (3) are processes taking place in a forward pass upon training the graphics processing neural network and (4), (5) and (6) are processes in a backward pass upon training the graphics processing neural network. The patch overlapping and cropping may be applied to (1)-(3) in the forward pass, allowing that each first patch has multiple augmented edge portions overlapping with edge portions of other first patches in the proximity thereof upon dividing the input image and an invalid portion generated on each output feature map associated with a corresponding first patch as a result of the effect of patch overlapping is cropped. For calculating gradients for updating weights of the feature extraction layers, the steps (3), which is originally executed in the forward pass, and (5) are termed as paired operation which is carried out in the backward pass. The philosophy behind the patch-based approach primarily targets at reducing the computations required for the feature extraction layers and improving prediction accuracy of the graphics processing neural network while leaving the rest in training the graphics processing neural network unchanged, if possible. The in-depth introduction of the patch-based approach is given in the following.

Being one prevalent embodiment of a typical graphics processing neural network, convolutional neural network (CNN) is adopted for subsequent description and some of correlated terms given earlier will be named in a way specific to CNN. The reason why we focus on the convolutional part, which is a term in CNN equivalent to the feature extraction layers, for the patch-based approach is because not all layers in a CNN support input dividing. For example, dense layers of CNN, which can be considered as one type of the classification layers, are not divisible since every single output value is calculated by a linear combination of all the input values, and normalization layers of CNN are also not divisible since normalization requires all values from all connected input feature maps. However, the convolutional part including multiple convolutional-like layers, such as convolutional layers and pooling layers, are divisible in spatial dimensions since an input value only corresponds to a kernel size of input values. Fortunately, feature maps produced by dense layers are far smaller than those produced by the convolutional-like layers and some studies suggest normalization layers may not be necessary in deep neutral networks. According to that scenario, with reference to FIG. 1, a CNN training process can be classified as a forward-convolutional pass, a forward-dense pass in the forward pass and a backward-convolutional pass and a backward-dense pass in the backward pass. In line with the classification, the convolutional part is isolated from the dense layers regardless of the forward pass or backward pass in an attempt to put on emphasis on the convolutional part which is unconventional while keeping training process in the dense layers intact as conventional CNN training process does.

Figure 2:
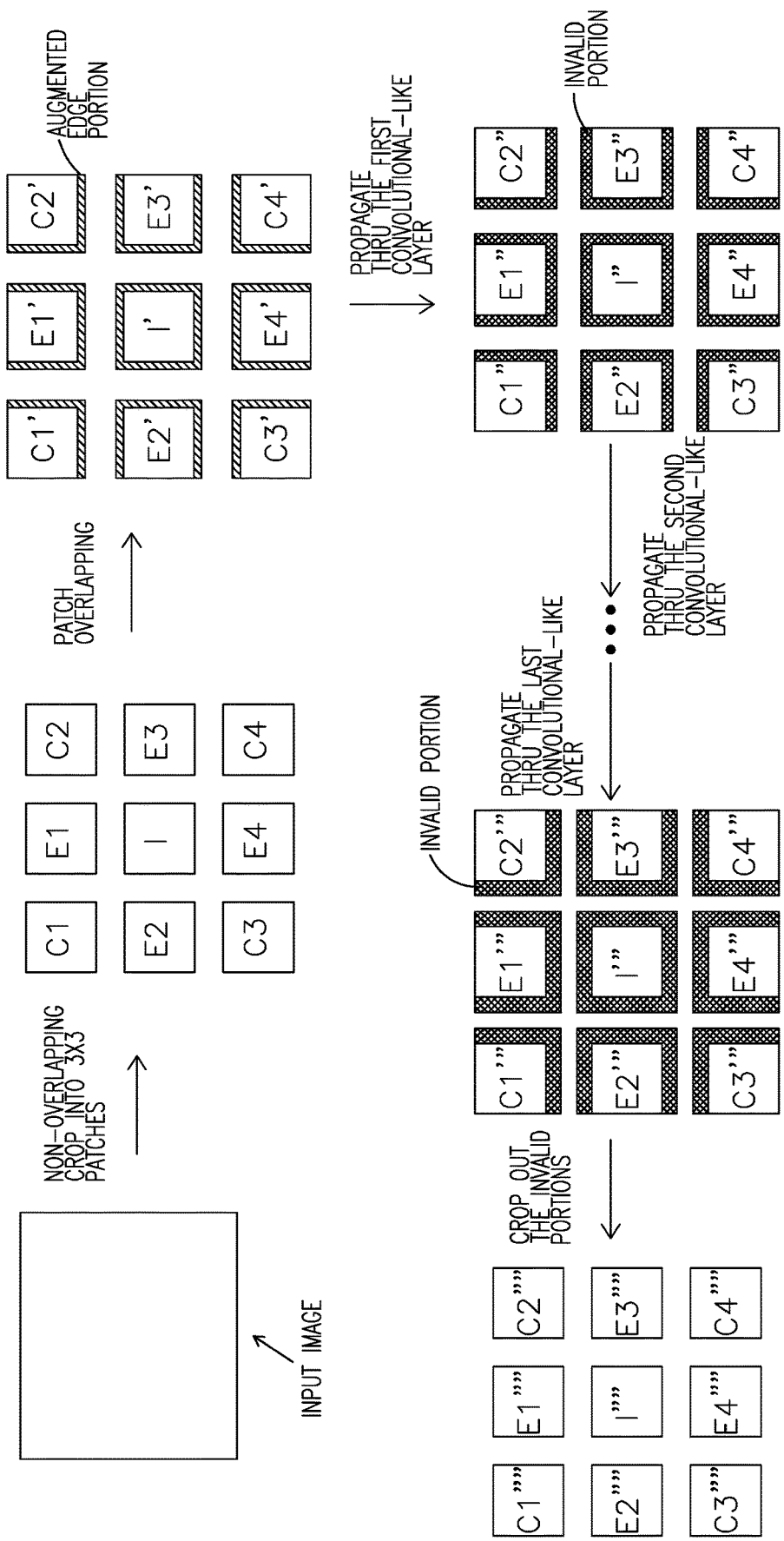
FIG. 2 is a schematic diagram showing a first embodiment of process for patch overlapping and cropping of invalid portion in a forward-convolutional pass of a CNN in accordance with the present invention.
Figure 3:
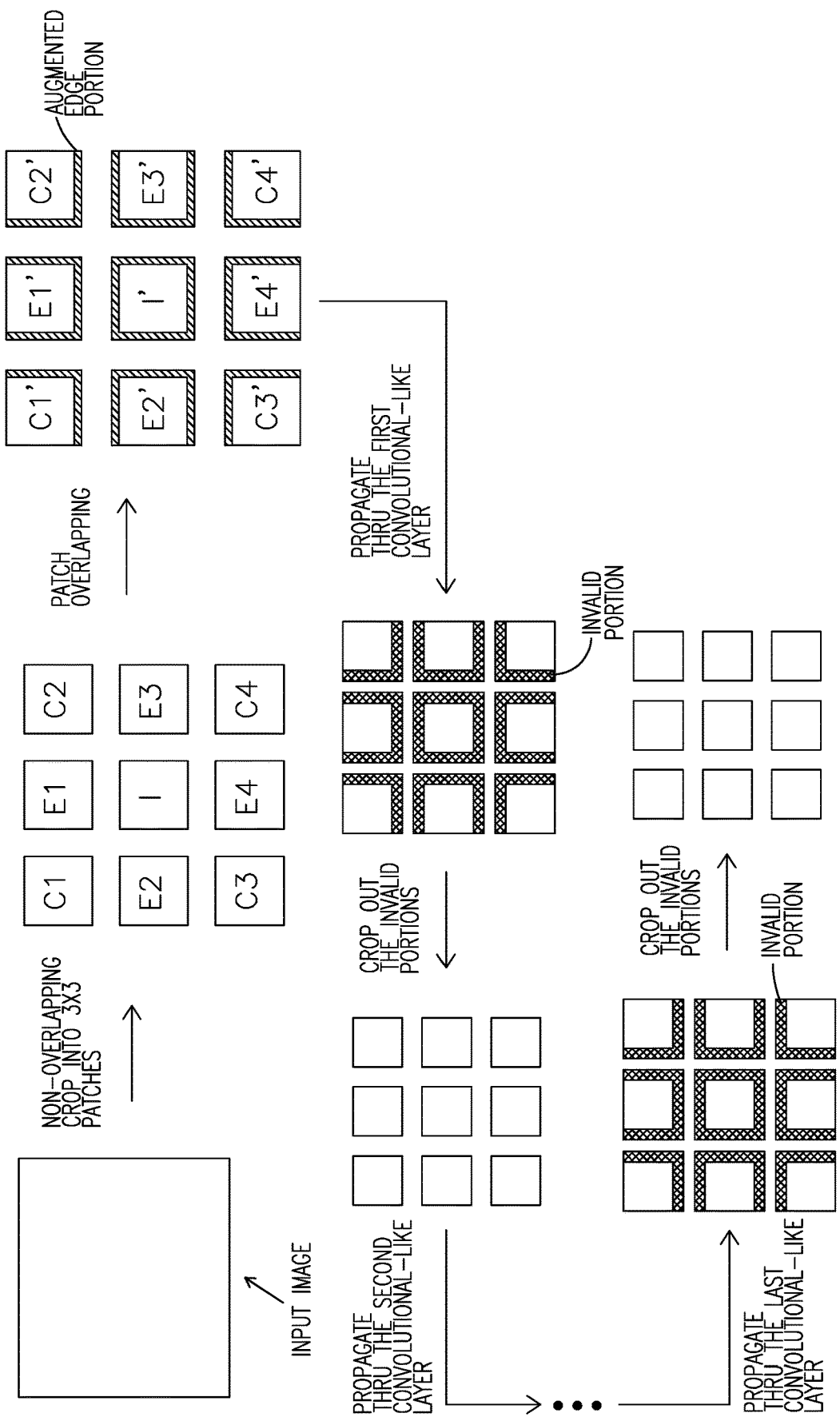
FIG. 3 is a schematic diagram showing a second embodiment of process for patch overlapping and cropping of invalid portion in a forward-convolutional pass of a CNN in accordance with the present invention.

Speaking of zero-padding, it has two-fold benefit for it to be applied to preserve features that exist at the edges of the original input and control the shrinkage of the output feature map in dimension, i.e. maintain the input and output of the convolutional-like layer equal in size, after filters larger than 1×1 are applied. Basically, zeros are usually taken as the information for padding because in reality, there is no information beyond the edges of the input of the convolutional-like layer and zeros are usually considered neutral. Basically, the zero-padding operation comes with a CNN model and the padding size for each convolutional-like layer is treated as one of the hyperparameters of the CNN model just like the kernel size and the stride size for each convolutional-like layer. The padding size may be optional and up to design of the CNN model. When zero-padding appears to be unnecessary for a convolutional-like layer, the padding size is set to be zero. In view of the pre-determined properties and operation, zero-padding will be executed as is with a corresponding CNN model while the zero-padding operation is intentionally not included in the following description and illustration unless necessary for not being the focus of the present invention and for the purpose of conciseness. When the input is a full image, there is no problem that zero-padding can simply do the job of preventing information loss on the boundary of an output feature map. However, after the input image is divided into multiple patches, zero-padding is not available around the edges of each input patch adjacent to the neighboring input patches and feeding the input patch into the convolutional part will result in a padding-affected portion on the margin of the output of each convolution-like layer. As the padding-affected portion contains information from not only zero-padding but also the margin of the input patch, removing the padding-affected portion will lose the information from the margin of the input patch. To cope with the information loss issue out of removing the padding-affected portion, the patch overlapping in the present invention serves as a measure to respectively pad information in the edge portions of each input patch in which the edge portions are next to corresponding margins of other adjacent input patches to the corresponding margins in advance. Thus, the information loss due to removing the padding-affected portion on the output of a convolutional-like layer associated with each input patch is no more a concern since the information on the edge portions of each input patch is also present in the neighboring input patches. Unlike information of patches exchanged during convolution as Google® proposes, those overlapped edge portions are prepared before the training starts. Such pre-preparation avoids the need of transferring marginal information from other neighboring input patches upon convolution on condition that all input patches should be processed in parallel and thus realizes sequential operation of the patches. After each input patch is fed into the convolutional part, the padding-affected portion or an invalid portion on the output of each convolutional-like layer needs to be cropped out. Please be noted that the patch overlapping is only applied once to the input patches before feeding the input patches to the training process of the CNN while it is optional that the invalid portion on the output of the last convolutional-like layer of the convolutional part only is cropped out or the invalid portions on the outputs of all the convolution-like layers associated with the input patches are cropped out when training the CNN with the input patches during the forward-convolutional pass. With reference to FIG. 2, a non-limiting first embodiment of illustrating the patch overlapping and cropping of the invalid portions is given. After a huge input image is divided into nine first patches, C1-C4, E1-E4, I, according to a patch pattern and a non-overlapping manner, each first patch, C1-C4, E1-E4, I, is padded with at least two augmented edge portions overlapping and containing information of corresponding number of edge portions of other first patches adjacent to the first patch according to an overlapping size in the height and width directions which specifies the size of the overlapped information along the height and width directions. After the patch overlapping is done, the resultant first patches C1'-C4', E1'-E4', I' are generated. Depending on where the first patch is in the patch pattern, two, three and four augmented edge portions, which are marked by slashes, are padded to the first patches at the corners C1'-C4', the edges E1'-E4' and the inner portion I' respectively. For example, the first patch C1' has two augmented edge portions over a bottom edge and a right edge thereof respectively, the first patch E3' has three augmented edge portions over a top edge, a bottom edge, and a left edge thereof respectively, and the first patch I' has four augmented edge portions over a top edge, a bottom edge, a left edge, and a right edge thereof respectively. The overlapping size in the width direction is applied to the top edge and the bottom edge of each first patch and the overlapping size in the height direction is applied to the left edge and the right edge of each first patch. Each resultant first patch, C1'-C4', E1'-E4', I', is then fed to the forward-convolutional pass to sequentially propagate through all the convolutional-like layers of the convolutional part. As illustrated in FIG. 2, after the first patches C1'-C4', E1'-E4', I' pass through the first convolutional-like layer, an invalid portion that is marked by cross lines is generated on the output of the first convolutional-like layer C1"-C4", E1"-E4", I" associated with each first patch C1'-C4', E1'-E4', I' in place of the original augmented edge portion on the first patch C1'-C4', E1'-E4', I'. The output of every convolutional-like layer associated with each first patch C1'-C4', E1'-E4', I' is fed to a next convolutional-like layer to generate the invalid portion thereon until there is no more convolutional-like layer in the convolutional part. After the last convolutional-like layer is passed through, the invalid portions, which are marked by cross lines and are generated on the output of the last convolutional-like layer C1'''-C4''', E1'''-E4''', I''' associated with the first patch C1-C4, E1-E4, I are cropped out to leave the output C1''''-C4'''', E1''''-E4'''', I'''' free of the invalid portion. Alternatively, the invalid portion on the output of every convolutional-like layer associated with each first patch is cropped out and the cropped output serves as the input into a next convolutional-like layer as shown in FIG. 3. The advantage of the former option is simplicity and plug-and-play to an existing CNN model building recipe. In contrast, the latter option is more efficient as the layer-to-layer cropping operations can reduce the amount of computations in subsequent convolutional-like layers. What the output of at least one convolutional-like layer is chosen to crop out the invalid portion thereon depends on a predetermined cropping scheme and the at least one invalid size of the at least one convolutional-like layer, which are elaborated in the following.

To implement the patch overlapping and cropping, several parameters, including the overlapping size and the invalid size, need to be calculated before the training starts. The padding size includes values in the height direction and in the width direction that respectively define the columns and the rows of zeros padded to the margin of the input patch in the height and width directions. As each of the size of the kernel size and the stride size usually have identical dimensions/values in the height and width directions, the padding height and the padding width depending on those values are also equal. Given one example for an input feature map being 100×100 in resolution and the padding size being [1, 1] in the height and width directions, the input for a convolutional-like layer after padding becomes 102×102. As for the invalid size for the output of each convolutional-like layer of the convolutional part, it corresponds to the invalid portion with rows and columns of invalid information on the output of the convolutional-like layer and is determined by the stride size, the padding size, and the invalid size for the input of the convolutional-like layer. The invalid size in the height direction and the width direction for the output of a convolutional-like layer is represented by $h_{invalid}^j$ and $w_{invalid}^j$. The equation for calculating the invalid size for the output of a convolutional-like layer in the height direction is expressed as follows:

$$h_{invalid}^j = \text{ceil}\left(\frac{h_{invalid}^i + h_p^j}{h_s^j}\right) \quad (1)$$

where $h_{invalid}^j$ is the invalid size for the output of the convolutional-like layer in the height direction;

$h_p^j$ is the padding size for the output of the convolutional-like layer in the height direction;

$h_s^j$ is the stride size for the output of the convolutional-like layer in the height direction;

$h_{invalid}^i$ is the invalid size for the input of the convolutional-like layer in the height direction;

ceil ( ) is the ceiling function.

Likewise, the invalid size for the output of the convolutional-like layer in the width direction $w_{invalid}^j$ can be obtained by substituting $w_p^j$, $w_s^j$ and $w_{invalid}^i$, which are the padding size and the stride size for the output of the convolutional-like layer and the invalid size for the input of the convolutional-like layer in the width direction respectively, into the equation (1). As each of the kernel size and the stride size usually take the forms of matrices with identical dimensions/values in the height and width directions, the invalid size for the output of the convolutional-like layer has equal values in the height direction and in the width direction. The above equation shows that the invalid size for the output of a convolutional-like layer is determined by the stride size and the padding size for the output of the convolutional-like layer and the invalid size for the input of the convolutional-like layer. The calculation of the invalid size is a sequential calculation process, which calculates the invalid size for the output of the first convolutional-like layer, then that for the output of the second convolutional-like layer, and so on until that for the output of the final convolutional-like layer. Initially, the input of the first convolutional-like layer [$h_{invalid}^i$, $w_{invalid}^i$] is assigned by [0, 0]. Such sequential process can obtain the invalid size in the height and width directions for the output of each convolutional-like layer.

As it is only the input patches that are padded with the overlapping size, the overlapping size for the input patches, which is the overlapping size for the input patches associated with the input of the first convolutional-like layer of the convolutional part, is all we need. Though obtaining the overlapping size for the input image also involves a sequential calculation process, it differs from the foregoing sequential calculation process for the invalid size as it sequentially calculates the overlapping sizes for the inputs of the convolutional-like layers of the convolutional part in a direction of the backward pass from the last convolutional-like layer to the first convolutional-like layer. Initially, the overlapping size of the output of the last convolutional-like layer initially is assigned to the invalid size for the output of the last convolutional-like layer when this value becomes available after the foregoing calculation of the invalid sizes. The equation for calculating the overlapping size for the input of a convolutional-like layer in the height direction is given below.

$$h_{reverse\_invalid}^i = h_k^j + h_s^j(h_{reverse\_valid}^j - 1) - h_p^j \quad (2)$$

where $h_{reverse\_invalid}^i$ is the overlapping size for the input of the convolutional-like layer in the height direction;

$h_k^j$ is the kernel size for the output of the convolutional-like layer in the height direction;

$h_s^j$ is the stride size for the output of the convolutional-like layer in the height direction;

$h_p^j$ is the padding size for the output of the convolutional-like layer in the height direction;

$h_{reverse\_invalid}^j$ is the overlapping size for the output of the convolutional-like layer in the height direction.

Similarly, the overlapping size for the input of the convolutional-like layer in the width direction $w_{reverse\_invalid}^i$ can be obtained by substituting $w_k^j$, $w_s^j$, $w_p^j$ and $w_{reverse\_invalid}^j$, which are the kernel size, the stride size, and the padding size for the output of the convolutional-like layer and the invalid size for the output of the convolutional-like layer in the width direction respectively, into the equation (2). As each of the kernel size, the stride size and the padding size usually take the forms of matrices with identical dimensions/values in the height and width directions, the overlapping size for the input of the convolutional-like layer has equal values in the height direction and the width direction. The equation (2) shows that the overlapping size for the input of a convolutional-like layer is determined by the kernel size, the stride size, the padding size and the invalid size for the output of the convolutional-like layer.

Figure 4:
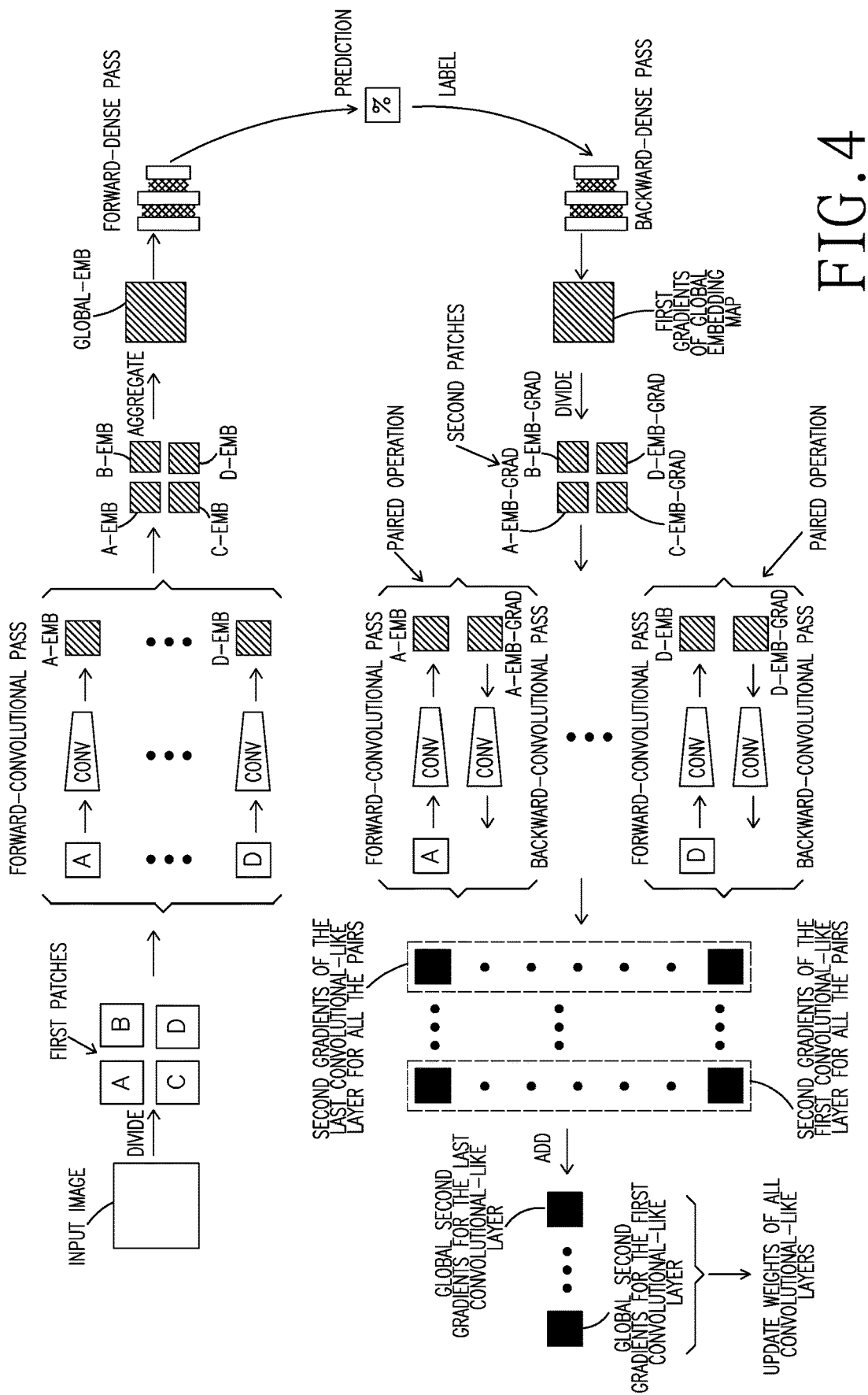
FIG. 4 is a schematic diagram showing a patch-based approach for training a CNN in accordance with the present invention.
Figure 5:
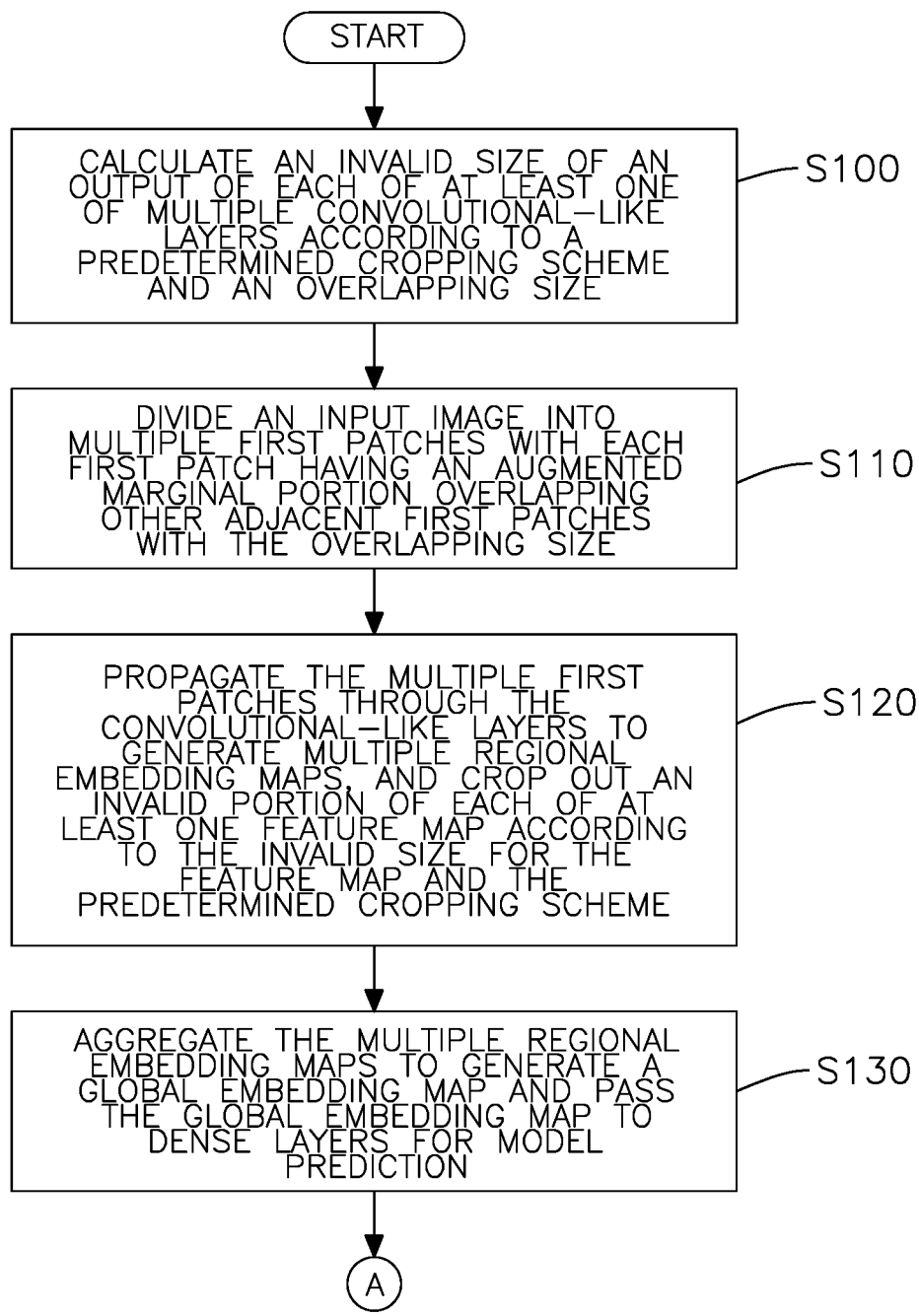
FIG. 5 is a flow diagram showing a method for training a CNN with the patch-based approach in FIG. 4 focusing on the forward pass.

In consideration of a less intricate explanation for a CNN training process, the zero-padding, please be reminded that though the patch overlapping and the cropping of invalid portion are a part of the training process, they are intentionally left out of the following description. According to a scenario that a CNN training includes a forward pass for model prediction and a backward pass for updating the weights of the dense layers and the convolutional-like layers, a method for training a CNN with a patch-based approach in accordance with the present invention includes the following steps in the forward pass as shown in FIG. 5 in conjunction with the illustration of FIG. 4.

Step S100: Calculate an invalid size of an output of each of at least one of multiple convolutional-like layers of a convolutional part CONV in the CNN according to a predetermined cropping scheme and an overlapping size. In general, the current step is a pre-processing step handling computation of the invalid size and the overlapping size that should take place before the CNN training process starts. The convolutional part CONV of the CNN here, as indicated earlier, pertains to the forward-convolutional pass and includes multiple convolutional layers and multiple pooling layers each of which is a convolutional-like layer. The predetermined cropping scheme selects at least one of multiple convolutional-like layers of a convolutional part CONV in the CNN as targeted layers from which invalid portions are cropping out. The at least one convolutional-like layer selected by the predetermined cropping scheme may include but not limited to the last convolutional-like layer only, every convolutional-like layer, every other one convolutional-like layer, or the like.

Step S110: Divide an input image into multiple first patches in a patch pattern with each first patch having an augmented marginal portion overlapping other first patches adjacent to the first patch with the overlapping size. The patch pattern here specifies an intended pattern about how the input image is divided into the multiple first patches. The size of each first patch can be configured up to a maximum size under the premise that the CNN training process can be operated with the input of each first patch in at least one processor with embedded memory without causing the at least one processor out-of-memory (OOM). With reference to FIG. 4, for simplicity in illustration, the input image is divided into a four first patches A, B, C, D. Certainly, the number of first patches is configurable as long as the size of the first patches won't cause the issue of OOM. Although not shown in FIG. 4 but shown in FIG. 2, the first patches A, B, C, D in the current step are in a condition done with the patch overlapping.

Step S120: Propagate the multiple first patches through the convolutional part CONV of the CNN to generate multiple regional embedding maps A-EMB, B-EMB, C-EMB, D-EMB each being an output or a feature map of a last convolutional-like layer of the convolutional part CONV associated with a corresponding first patch A, B, C, D and crop out an invalid portion from each of at least one feature map according to the invalid size for each of the at least one feature map and the predetermined cropping scheme. After the multiple first patches A, B, C, D sequentially propagate through all the convolutional-like layers to generate the respective regional embedding maps A-EMB, B-EMB, C-EMB, D-EMB. Each of the regional embedding maps A-EMB, B-EMB, C-EMB, D-EMB indicates an output of a last convolutional-like layer of the convolutional part CONV associated with a corresponding first patch A, B, C, D. Propagating each first patch A, B, C, D through all the convolutional-like layers generates not only the corresponding regional embedding map A-EMB, B-EMB, C-EMB, D-EMB but all other feature maps outputted from the convolutional-like layer before the last convolutional-like layer. Despite no illustration, each of the regional embedding maps A-EMB, B-EMB, C-EMB, D-EMB is in a condition that the invalid portion is cropped out of it. Depending on the predetermined cropping scheme, the regional embedding maps A-EMB, B-EMB, C-EMB, D-EMB may be all or a part of the at least one feature maps of the convolutional-like layers with the at least one corresponding invalid portion to be cropped out. The measure that all feature maps except the regional embedding maps are not intentionally stored is to fulfill the end of significantly lowering memory storage for feature maps which are used for gradient calculation in the backward pass. To implement the measure, the feature maps for the first patches A, B, C, D will be recalculated and renewed in the backward pass every time when the feature maps are required for updating weights of the convolutional-like layers of the convolutional part CONV.

Step S130: Aggregate the multiple regional embedding maps A-EMB, B-EMB, C-EMB, D-EMB according to the patch pattern to generate a global embedding map GLOBAL-EMB and pass the global embedding map GLOBAL-EMB to dense layers in the forward pass for model prediction. Before passing the dense layers, the regional embedding maps A-EMB, B-EMB, C-EMB, D-EMB are aggregated into the global embedding map GLOBAL-EMB according to the patch pattern. In other words, the regional embedding maps A-EMB, B-EMB, C-EMB, D-EMB are aggregated into the global embedding map GLOBAL-EMB according to the geometric locations of the first patches specified by the patch pattern in the input image. The global embedding map GLOBAL-EMB may be considered as an aggregated output of the last convolutional-like layer originating from the first patches A, B, C, D and the aggregated output is used to pass through the dense layers for model prediction. As also indicated, the dense layers here pertain to the forward-dense pass, which is conventionally performed and is thus not further elaborated.

Figure 6:
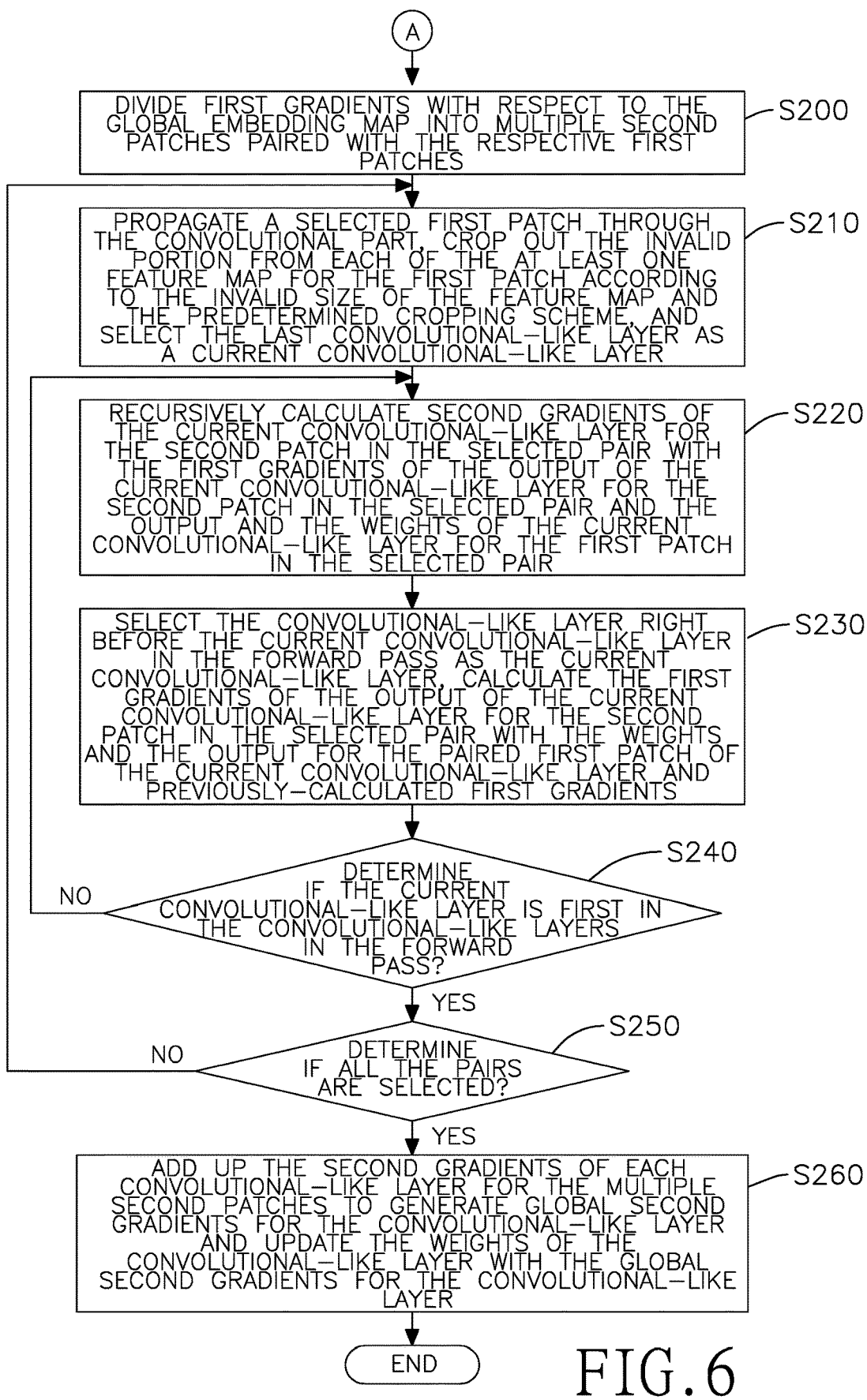
FIG. 6 is a flow diagram showing the method for training a CNN with a patch-based approach in FIG. 4 focusing on the backward pass.

With reference to FIG. 6 in conjunction with the illustration of FIG. 4, the method for training the CNN with the patch-based approach in accordance with the present invention includes the following steps in the backward pass.

Step S200: Divide first gradients with respect to the global embedding map in a backward pass into multiple second patches paired with the respective first patches according to the patch pattern. As being conventionally performed, the backward-dense pass is skipped. Subsequently, what information matters for updating weights of the convolutional part CONV in the first place is the gradients (partial derivatives of error) generated right after the dense layers in the backward pass, which are the first gradients with respect to the global embedding map for the first patches. As the first gradients also take the form of a matrix, dividing the first gradients into the multiple second patches, each of which is substantially a part of the matrix, according to the patch pattern appears to be a task to map each second patch to a corresponding first patch, which is also a part of a matrix for the input image with its numbers of column and row and location corresponding to those of the second patch according to the patch pattern. As illustrated in FIG. 4, in one embodiment, the first gradients are represented by and are divided into four second patches, A-EMB-GRAD, B-EMB-GRAD, C-EMB-GRAD, D-EMB-GRAD, to pair with the respective first patches A, B, C, D.

Step S210: Propagate the first patch in a newly selected pair (A, A-EMB-GRAD), (B, B-EMB-GRAD), (C, C-EMB-GRAD), (D, D-EMB-GRAD) in the forward pass through the convolutional part CONV to generate an output of each convolutional-like layer, crop out the invalid portion from each of the at least one feature map for the first patch according to the invalid size of the feature map and the predetermined cropping scheme, and select the last convolutional-like layer as a current convolutional-like layer. Because the feature maps for each first patch generated by the convolutional part CONV in the forward pass are not stored for the purpose of saving memory space, the feature maps for each first patch thus need to be recalculated in the backward pass for computing the gradients of updating weights of the convolutional-like layers. As shown in FIG. 4, the feature maps of the first patches A, B, C, D recalculated in forward pass are forwarded to the backward pass for calculating the gradients for weight update. The two options mentioned earlier for handling the cropping of invalid portion throughout the convolutional-like layers of the convolutional part CONV are applicable to the current step as well. Since the last convolutional-like layer in the convolutional part CONV is the first layer from which the backward pass starts propagating the convolutional part CONV for weight update, the last convolutional-like layer of the convolutional part CONV is set to be the current convolutional-like layer at the start of the backward-convolutional pass.

Step S220: Recursively calculate second gradients of updating weights of the current convolutional-like layer for each second patch A-EMB-GRAD, B-EMB-GRAD, C-EMB-GRAD, D-EMB-GRAD in the selected pair with the first gradients with respect to the output of the current convolutional-like layer for the second patch A-EMB-GRAD, B-EMB-GRAD, C-EMB-GRAD, D-EMB-GRAD in the selected pair and the output and the weights of the current convolutional-like layer for the first patch in the selected pair. Given an $i^{th}$ convolutional-like layer of the convolutional part CONV with its weight $w_i$, output $o_i$ and the error denoted as L, the equation of calculating the gradients for updating the weights of each convolutional-like layer is expressed by:

$$\frac{\partial L}{\partial \omega_i} = \frac{\partial L}{\partial o_i} * \frac{\partial o_i}{\partial \omega_i} \qquad (3)$$

The term on the left side of the equal sign is the second gradients of updating the weight $w_i$ of the $i^{th}$ convolutional-like layer for one of the second patches. On the right side of the equal sign, the first term is the first gradients generated with respect to the output of the $i^{th}$ convolutional-like layer for the second patch A-EMB-GRAD, B-EMB-GRAD, C-EMB-GRAD, D-EMB-GRAD, and the second term is the partial derivatives of the output of the $i^{th}$ convolutional-like layer over the weights of the $i^{th}$ convolutional-like layer for the second patch A-EMB-GRAD, B-EMB-GRAD, C-EMB-GRAD, D-EMB-GRAD, which can be calculated with the output for the first patch A, B, C, D and the weights of the $i^{th}$ convolutional-like layer. It can be understood that the second patches are divided from the first gradients with respect to the output of the last convolutional-like layer from the step S200. Since the feature maps or the outputs for all the convolutional-like layers associated with the first patches A, B, C, D are available in the step S210 and the weights of each convolutional-like layer are parameters given initially, the second gradients of updating the weights of the last convolutional-like layer associated with the selected pair can thus be obtained with the second patch A-EMB-GRAD, B-EMB-GRAD, C-EMB-GRAD, D-EMB-GRAD in the selected pair and the feature map and weights of the last convolutional-like layer for the first patch A, B, C, D in the selected pair. In a direction of the backward pass, the second gradients of updating the weights of the remaining convolutional-like layers are calculated from the convolutional-like layer right before the last convolutional-like layer to the first convolutional-like layer.

Step S230: Select the convolutional-like layer right before the current convolutional-like layer in the forward pass as the current convolutional-like layer, calculate the first gradients with respect to the output of the current convolutional-like layer for the second patch in the selected pair A-EMB-GRAD, B-EMB-GRAD, C-EMB-GRAD, D-EMB-GRAD with the weights and the output for the first patch in the selected pair of the current convolutional-like layer and previously-calculated first gradients. The current step intends to update the current convolutional-like layer as a precedent convolutional-like layer right before it in the forward pass. The first gradients generated with respect to the updated current convolutional-like layer will be used for calculating the second gradients of updating weights of the current convolutional-like layer. The previously-calculated first gradients are generated with respect to the output of a previously selected convolutional-like layer. What is indicated in the step 210 is about the operation in the forward-convolutional pass for the first patch A, B, C, D in each selected pair. On the other hand, what are indicated in the step 220 and the step S230 is about the operation in the backward-convolutional pass for the second patch A-EMB-GRAD, B-EMB-GRAD, C-EMB-GRAD, D-EMB-GRAD in the selected pair. As a whole, the steps S210 to S230 perform the paired operation for the first patch A, B, C, D and the second patch A-EMB-GRAD, B-EMB-GRAD, C-EMB-GRAD, D-EMB-GRAD in each pair and the paired operation enables the generation of the second gradients of updating weights of each convolutional-like layer for each pair.

Step S240: Determine if the current convolutional-like layer is first in the convolutional-like layers in the forward pass. When the determination result is positive, perform step S250. Otherwise, repeat the step S220. The current step in conjunction with the step S220 forms a small loop in calculating all the second gradients of updating weights of all the convolutional-like layers for the selected pair of first patch A, B, C, D and second patch A-EMB-GRAD, B-EMB-GRAD, C-EMB-GRAD, D-EMB-GRAD.

Step S250: Determine if all the pairs are selected. When the determination result is positive, perform step S260. Otherwise, repeat the steps S210 to S230. The current step in conjunction with the steps S210 to S230 forms a larger loop in completing all the second gradients of updating weights of all the convolutional-like layers for all the pairs for the first patches A, B, C, D and the second patches A-EMB-GRAD, B-EMB-GRAD, C-EMB-GRAD, D-EMB-GRAD.

Step S260: Add up the second gradients of updating the weights of each convolutional-like layer for the multiple second patches A-EMB-GRAD, B-EMB-GRAD, C-EMB-GRAD, D-EMB-GRAD to generate global second gradients for the convolutional-like layer and updating the weights of the convolutional-like layer with the global second gradients for the convolutional-like layer. As all the second gradients of updating weights of all the convolutional-like layers for all the pairs of first patch A, B, C, D and second patch A-EMB-GRAD, B-EMB-GRAD, C-EMB-GRAD, D-EMB-GRAD are available, the second gradients of updating weights of each convolutional-like layer for the multiple second patches A-EMB-GRAD, B-EMB-GRAD, C-EMB-GRAD, D-EMB-GRAD are added up to form the global second gradients for all the convolutional-like layers and the global second gradients for all the convolutional-like layers can be used to update the weights of all the convolutional-like layers.

Please be noted that a system for training a CNN, which includes at least one processor with embedded memory, can be provided with computer-executable instructions thereupon, and alternatively, the computer-executable instructions cause the system to perform or the at least one processor performs the foregoing method as illustrated in FIGS. 5 and 6 when the computer-executable instructions are executed by the at least one processor to perform the training process specified by the foregoing method on the at least one processor. Each of the at least one processor may be one of a CPU, a GPU, a TPU, a VPU, a DPU, and an IPU. Basically, one of the at least one processor handles the steps S100, S110, S130, S200, and S240 to S260 and the at least one processor takes care of the steps S120 and S210 to S230. Depending on whether the at least one processor includes one processor or multiple processors, the regional embedding maps for the multiple first patches in the step S120, feature maps of all the convolutional-like layers for the multiple first patches in the step S210, and the first gradients and the second gradients associated with the multiple pairs of first patches and second patches in the steps S210 to S260 are sequentially generated by the processor or are parallelly generated by the multiple processors. Further to the case of the multiple processors, after all the regional embedding maps for the multiple first patches are generated in the step S120, they must be sent to a selected one of the multiple processors to generate the global embedding map for model prediction in the step S130; after the first gradients with respect to the global embedding map are divided into the multiple second patches in the selected processor, the selected processor distributes the multiple second patches to the multiple processors for each processor to process the paired operation associated with one pair of first patch and second patch in the steps S210 to S250. The calculated second gradients of updating the weights of all the convolutional-like layers for each second patch are further forwarded to a selected processor for the selected processor to add them up to generate the global second gradients for each convolutional-like layer and update the weights of all the convolutional-like layers with the global second gradients of all the convolutional-like layers in the step S260.

Owing to the small size and sequential operation of the patches, the feature maps required for gradient calculation can be recalculated in the backward pass without having to be stored throughout the entire training process of a graphics processing neural network. The sequential patch execution and recalculation of the feature maps at the backward pass of the training process are the key success factors contributing to enhanced memory utilization of the embedded memory of at least one processor when the graphics processing neural network is trained on a computing platform including the at least one processor and the embedded memory. The zero-padding, the patch overlapping, and the cropping of invalid portion on output feature maps are dedicated to prevent the issue of information loss on the boundary of output feature maps for assurance of accurate model prediction. Moreover, as the patch overlapping is implemented before the training starts without requiring to exchange marginal information of the image patches at a runtime of the training, such feature is also crucial for the image patches to be sequentially processed.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for training a graphic processing neural network with a patch-based approach, the method performed by a system including at least a processor with embedded memory, the method comprising:
   (a) one of the at least one processor calculating an overlapping size and an invalid size of an output of each of at least one of multiple feature extraction layers of the graphic processing neural network according to a predetermined cropping scheme;
   (b) one of the at least one processor dividing an input image into multiple first patches in a patch pattern with each first patch having an augmented marginal portion overlapping other first patches adjacent to the first patch with the overlapping size;
   (c) the at least one processor propagating the multiple first patches through the multiple feature extraction layers of the graphic processing neural network in a forward pass for each first patch to generate multiple feature maps, and cropping out an invalid portion from each of at least one feature map for each first patch according to the invalid size of the feature map and the predetermined cropping scheme; and
   (d) one of the at least one processor aggregating the last feature maps associated with the first patches according to the patch pattern to generate a global embedding map and passing the global embedding map to classification layers of the graphic processing neural network in the forward pass for model prediction.

2. The method as claimed in claim 1, further comprising:
   (e) one of the at least one processor dividing first gradients of the global embedding map in a backward pass into multiple second patches paired with the respective first patches according to the patch pattern;
   (f) the at least one processor propagating the multiple first patches through the multiple feature extraction layers in the forward pass for each first patch to generate the multiple feature maps, and cropping out an invalid portion from each of the at least one feature map for the first patch according to the invalid size of the feature map and the predetermined cropping scheme;
   (g) the at least one processor selecting a last one of the feature extraction layers as a current feature extraction layer and recursively calculating second gradients of the current feature extraction layer for each second patch in the backward pass with the first gradients with respect to the output of the current feature extraction layer and the output and the weights of the current feature extraction layer for the first patch in a same pair, replacing the current feature extraction layer with the feature extraction layer right before the current feature extraction layer in the forward pass, and calculating the first gradients with respect to the output of the current feature extraction layer for the second patch in the selected pair with the weights and the output for the first patch in the same pair of a previous feature extraction layer and previously-calculated first gradients until the current feature extraction layer is first in the feature extraction layers in the forward pass and all the pairs are selected; and
   (h) one of the at least one processor adding up the second gradients of each feature extraction layer for the multiple second patches to generate global second gradients and updating weights of the feature extraction layer with the global second gradients.

3. The method as claimed in claim 2, wherein when executed in one processor, the last feature maps for the multiple first patches in the step (c), the feature maps of all the feature extraction layers for the multiple first patches in the step (f), and the first gradients and the second gradients for the multiple first patches in the step (g) are sequentially generated in the processor.

4. The method as claimed in claim 2, wherein when executed in multiple processors, the last feature maps for the multiple first patches in the step (c), the feature maps of all the feature extraction layers for the multiple first patches in the step (f), and the first gradients and the second gradients associated with the multiple pairs of first patches and second patches in the step (g) are parallelly generated in the processors.

5. The method as claimed in claim 1, wherein in the step (b) the input image is divided with a size of each first patch being a maximum without causing the at least one processor out-of-memory upon inputting the first patches to the at least one processor to train the graphics processing neural network in the at least one processor.

6. The method as claimed in claim 1, wherein in the step (a),
the invalid size for the output of each of the feature extraction layers is determined by a stride size and a padding size for the output of the feature extraction layer and the invalid size for the input of the feature extraction layer, and the predetermined cropping scheme, wherein the invalid size for the input of a first one of the feature extraction layers is initially assigned by zero and the predetermined cropping scheme selects each output of the at least one feature extraction layer from which the invalid portion thereon with a corresponding invalid size is cropped out; and
the overlapping size for the input of each of the feature extraction layers is determined by the kernel size, the stride size, the padding size and the invalid size for the output of the feature extraction layer, wherein the overlapping size for the input image is the overlapping size for the input of the first feature extraction layer that is obtained by sequentially calculating the overlapping sizes for the inputs of the feature extraction layers in a direction of the backward pass from a last one to a first one of the feature extraction layers with the overlapping size of the output of the last feature extraction layer initially assigned to the invalid size of the global embedding map.

7. The method as claimed in claim 1, wherein the augmented marginal portion of each first patch overlaps an edge of each of at least two other first patches adjacent to the first patch.

8. The method as claimed in claim 1, wherein the predetermined cropping scheme selects each output of a last feature extraction layer, every one of the feature extraction layers, or every other feature extraction layer from which the invalid portion thereon with a corresponding invalid size is cropped out, and when one of the feature extraction layer is not last in the feature extraction layers, the cropped output of the feature extraction layer is inputted to a next feature extraction layer.

9. The method as claims in claim 1, wherein
the graphics processing neural network is a convolutional neural network, the feature extraction layers are convolutional-like layers including convolutional layers and pooling layers, and the classification layers are dense layers; and
the at least one processor includes a combination of central processing unit (CPU), graphics processing unit (GPU), tensor processing unit (TPU), vision processor unit (VPU), dataflow processing unit (DPU), intelligent processing unit (IPU).

10. An input image for training a graphics processing neural network, comprising multiple image patches divided according to a patch pattern, wherein each image patch overlaps other first patches adjacent thereto with an augmented marginal portion overlapping other image patches adjacent to the image patch with an overlapping size, the multiple image patches are adapted to propagate through multiple feature extraction layers of the graphics processing neural network to train the graphics processing neural network, and an invalid size of each image patch outputted from at least one of the feature extraction layers is cropped out,
wherein the invalid size for an output of each of the feature extraction layers is determined by a stride size and a padding size for the output of the feature extraction layer, the invalid size for the input of the feature extraction layer, and a predetermined cropping scheme with the input of a first one of the feature extraction layers initially assigned to zero, and the overlapping size for the input of each of the feature extraction layers is determined by the kernel size, the stride size, the padding size, and the invalid size for the output of the feature extraction layer, wherein the predetermined cropping scheme selects each output of the at least one feature extraction layer from which the invalid portion thereon with a corresponding invalid size is cropped out, and the overlapping size for the image patches is the overlapping size for the input of the first feature extraction layer that is obtained by sequentially calculating the overlapping sizes for the inputs of the feature extraction layers in a direction of a backward pass from a last one to a first one of the feature extraction layer with the overlapping size of the output of the last feature extraction layer initially assigned to the invalid size of the output of the last feature extraction layer.

11. The input image as claimed in claim 10, wherein each image patch has a size being a maximum without causing at least one processor out-of-memory upon inputting the image patches to the at least one processor to train the graphics processing neural network in the at least one processor.

12. The input image as claimed in claim 10, wherein the augmented marginal portion of each image patch overlaps an edge of each of at least two other image patches adjacent to the image patch.

13. The input image as claimed in claim 10, wherein the predetermined cropping scheme selects each output of a last feature extraction layer, every one of the feature extraction layers, or every other feature extraction layer from which the invalid portion thereon with a corresponding invalid size is cropped out, and when one of the feature extraction layer is not last in the feature extraction layers, the cropped output of the feature extraction layer is inputted to a next feature extraction layer.

14. A non-transitory computer storage medium having computer-executable instructions thereupon that, when executed by at least one processor with embedded memory, cause:
(a) the at least one processor to calculate an overlapping size and an invalid size of an output of each of at least one of multiple feature extraction layers of a graphics processing neural network according to a predetermined cropping scheme;
(b) the at least one processor to divide the input image into the multiple first patches in a patch pattern with each first patch having an augmented marginal portion overlapping other first patches adjacent to the first patch with the overlapping size;
(c) the at least one processor to propagate the multiple first patches through the feature extraction layers of the graphics processing neural network in a forward pass for each first patch to generate multiple feature maps, and to crop out an invalid portion from each of at least one feature map for each first patch according to the invalid size of the feature map and the predetermined cropping scheme; and (d) one of the at least one processor to aggregate the last feature maps associated with the first patches according to the patch pattern to generate a global embedding map and to pass the global embedding map to classification layers of the graphics processing neural network in the forward pass for model prediction.

15. The computer storage medium as claimed in claim 14, when executed by the at least one processor, the computer-executable instructions further cause:
(e) one of the at least one processor to divide first gradients with respect to the global embedding map in a backward pass into multiple second patches paired with the respective first patches according to the patch pattern;
(f) one of the at least one processor to propagate the multiple first patches through the multiple feature extraction layers in the forward pass for each first patch to generate the multiple feature maps, and to crop out an invalid portion from each of the at least one feature map for the first patch according to the invalid size of the feature map and the predetermined cropping scheme;
(g) the at least one processor to select a last one of the feature extraction layers as a current feature extraction layer and to recursively calculate second gradients of the current feature extraction layer for each second patch in the backward pass with the first gradients with respect to the output of the current feature extraction layer and the output and the weights of the current feature extraction layer for the first patch in a same pair, to replace the current feature extraction layer with the feature extraction layer right before the current feature extraction layer in the forward pass, and to calculate the first gradients with respect to the output of the current feature extraction layer for the second patch in the selected pair with the weights and the output for the first patch in the same pair of a previous feature extraction layer and previously-calculated first gradients until the current feature extraction layer is first in the feature extraction layers in the forward pass and all the pairs are selected; and
(h) one of the at least one processor to add up the second gradients of each feature extraction layer for the multiple second patches to generate global second gradients and updating weights of the feature extraction layer with the global second gradients.

16. The computer storage medium as claimed in claim 14, wherein in the step (b) the input image is divided with a size of each first patch being a maximum without causing the at least one processor out-of-memory upon inputting the first patches to the at least one processor to train the graphics processing neural network in the at least one processor.

17. The computer storage medium as claimed in claim 14, wherein in the step (a),
the invalid size for the output of each of the feature extraction layers is determined by a stride size and a padding size for the output of the feature extraction layer, and the invalid size for the input of the feature extraction layer and the predetermined cropping scheme, wherein the invalid size for the input of a first one of the feature extraction layers is initially assigned by zero and the predetermined cropping scheme selects each output of the at least one feature extraction layer from which the invalid portion with a corresponding invalid size is cropped out; and
the overlapping size for the input of each of the feature extraction layers is determined by the kernel size, the stride size, the padding size and the invalid size for the output of the feature extraction layer, wherein the overlapping size for the input image is the overlapping size for the input of the first feature extraction layer that is obtained by sequentially calculating the overlapping sizes for the inputs of the feature extraction layers in a direction of the backward pass from a last one to a first one of the feature extraction layers with the overlapping size of the output of the last feature extraction layer initially assigned to the invalid size of the global embedding map.

18. The computer storage medium as claimed in claim 14, wherein the augmented marginal portion of each first patch overlaps an edge of each of at least two other first patches adjacent to the first patch.

19. The computer storage medium as claimed in claim 14, wherein the predetermined cropping scheme selects each output of a last feature extraction layer, every one of the feature extraction layers, or every other feature extraction layer from which the invalid portion thereon with a corresponding invalid size is cropped out, and when one of the feature extraction layer is not last in the feature extraction layers, the cropped output of the feature extraction layer is inputted to a next feature extraction layer.

20. The computer storage medium as claimed in claim 14, where
the graphics processing neural network is a convolutional neural network, the feature extraction layers are convolutional-like layers including convolutional layers and pooling layers, and the classification layers are dense layers; and
the at least one processor includes a combination of central processing unit (CPU), graphics processing unit (GPU), tensor processing unit (TPU), vision processor unit (VPU), dataflow processing unit (DPU), intelligent processing unit (IPU).

21. A system comprising:
at least one processor with embedded memory storing instructions that, when executed by the at least one processor, cause the at least one processor to perform acts comprising:
(a) one of the at least one processor calculating an overlapping size and an invalid size of an output of each of at least one of multiple feature extraction layers of the graphic processing neural network according to a predetermined cropping scheme;
(b) one of the at least one processor dividing an input image into multiple first patches in a patch pattern with each first patch having an augmented marginal portion overlapping other first patches adjacent to the first patch with the overlapping size;
(c) the at least one processor propagating the multiple first patches through the multiple feature extraction layers of the graphic processing neural network in a forward pass for each first patch to generate multiple feature maps, and cropping out an invalid portion from each of at least one feature map for each first patch according to the invalid size of the feature map and the predetermined cropping scheme; and
(d) one of the at least one processor aggregating the last feature maps associated with the first patches according to the patch pattern to generate a global embedding map and passing the global embedding map to classification layers of the graphic processing neural network in the forward pass for model prediction.

22. The system as claimed in claim 21, wherein the instructions further cause the at least one processor to perform acts comprising:
(e) one of the at least one processor dividing first gradients of the global embedding map in a backward pass into multiple second patches paired with the respective first patches according to the patch pattern;
(f) the at least one processor propagating the multiple first patches through the multiple feature extraction layers in the forward pass for each first patch to generate the multiple feature maps, and cropping out an invalid portion from each of the at least one feature map for the first patch according to the invalid size of the feature map and the predetermined cropping scheme;
(g) the at least one processor selecting a last one of the feature extraction layers as a current feature extraction layer and recursively calculating second gradients of the current feature extraction layer for each second patch in the backward pass with the first gradients with respect to the output of the current feature extraction layer and the output and the weights of the current feature extraction layer for the first patch in a same pair, replacing the current feature extraction layer with the feature extraction layer right before the current feature extraction layer in the forward pass, and calculating the first gradients with respect to the output of the current feature extraction layer for the second patch in the selected pair with the weights and the output for the first patch in the same pair of a previous feature extraction layer and previously-calculated first gradients until the current feature extraction layer is first in the feature extraction layers in the forward pass and all the pairs are selected; and
(h) one of the at least one processor adding up the second gradients of each feature extraction layer for the multiple second patches to generate global second gradients and updating weights of the feature extraction layer with the global second gradients.

23. The system as claimed in claim 22, wherein when the at least one processor includes one processor, the last feature maps for the multiple first patches in the step (c), the feature maps of all the feature extraction layers for the multiple first patches in the step (f), and the first gradients and the second gradients for the multiple first patches in the step (g) are sequentially generated in the processor.

24. The system as claimed in claim 22, wherein when the at least one processor includes multiple processors, the last feature maps for the multiple first patches in the step (c), the feature maps of all the feature extraction layers for the multiple first patches in the step (f), and the first gradients and the second gradients associated with the multiple pairs of first patches and second patches in the step (g) are parallelly generated in the processors.

25. The system as claimed in claim 21, wherein in the step (b) the input image is divided with a size of each first patch being a maximum without causing the at least one processor out-of-memory upon inputting the first patches to the at least one processor to train the graphics processing neural network in the at least one processor.

26. The system as claimed in claim 21, wherein in the step (a),
the invalid size for the output of each of the feature extraction layers is determined by a stride size and a padding size for the output of the feature extraction layer and the invalid size for the input of the feature extraction layer and the predetermined cropping scheme, wherein the invalid size for the input of a first one of the feature extraction layers is initially assigned by zero and the predetermined cropping scheme selects each output of the at least one feature extraction layer from which the invalid portion with a corresponding invalid size is cropped out; and
the overlapping size for the input of each of the feature extraction layers is determined by the kernel size, the stride size, the padding size and the invalid size for the output of the feature extraction layer, wherein the overlapping size for the input image is the overlapping size for the input of the first feature extraction layer that is obtained by sequentially calculating the overlapping sizes for the inputs of the feature extraction layers in a direction of the backward pass from a last one to a first one of the first feature extraction layers with the overlapping size of the output of the last feature extraction layer initially assigned to the invalid size of the global embedding map.

27. The system as claimed in claim 21, wherein the augmented marginal portion of each first patch overlaps an edge of each of at least two other first patches adjacent to the first patch.

28. The system as claimed in claim 21, wherein the predetermined cropping scheme selects each output of a last feature extraction layer, every one of the feature extraction layers, or every other feature extraction layer from which the invalid portion thereon with a corresponding invalid size is cropped out, and when one of the feature extraction layer is not last in the feature extraction layers, the cropped output of the feature extraction layer is inputted to a next feature extraction layer.

29. The system as claimed in claim 21, wherein
the graphics processing neural network is a convolutional neural network, the feature extraction layers are convolutional-like layers including convolutional layers and pooling layers, and the classification layers are dense layers; and
the at least one processor includes a combination of central processing unit (CPU), graphics processing unit (GPU), tensor processing unit (TPU), vision processor unit (VPU), dataflow processing unit (DPU), intelligent processing unit (IPU).

* * * * *